United States Patent
Ziltener et al.

(10) Patent No.: US 7,192,630 B2
(45) Date of Patent: Mar. 20, 2007

(54) DISK METHOD FOR PRODUCING THE SAME AND DEVICE FOR CARRYING OUT SAID METHOD

(75) Inventors: Christoph Ziltener, Flawil (CH); Hans Heinimann, Rorschach (CH); Ernst Werner, Flawil (CH); Joseph Mavely, Eningen (DE); Martin Dauner, Esslingen (DE)

(73) Assignee: Flawa AG, Flawil (CH)

( * ) Notice: Subject to any disclaimer, the term of this patent is extended or adjusted under 35 U.S.C. 154(b) by 239 days.

(21) Appl. No.: 10/478,875

(22) PCT Filed: Apr. 28, 2003

(86) PCT No.: PCT/CH03/00274

§ 371 (c)(1),
(2), (4) Date: Jun. 22, 2004

(87) PCT Pub. No.: WO03/090653

PCT Pub. Date: Nov. 6, 2003

(65) Prior Publication Data

US 2004/0236296 A1    Nov. 25, 2004

(30) Foreign Application Priority Data

Apr. 26, 2002  (CH) .................... 0714/02

(51) Int. Cl.
*A61F 13/15* (2006.01)

(52) U.S. Cl. .................... 428/66.7; 428/157; 604/380; 132/320

(58) Field of Classification Search ............. 428/66.7, 428/157, 195.1, 211.1; 132/320; 606/380, 606/379
See application file for complete search history.

(56) References Cited

U.S. PATENT DOCUMENTS

| | | | | |
|---|---|---|---|---|
| 3,881,490 A | * | 5/1975 | Whitehead et al. | 604/366 |
| 4,650,481 A | * | 3/1987 | O'Connor et al. | 604/380 |
| 5,104,396 A | * | 4/1992 | Oatley et al. | 604/379 |
| 5,928,184 A | | 7/1999 | Etheredge et al. | |
| 2003/0093047 A1 | * | 5/2003 | Nguyen et al. | 604/368 |

FOREIGN PATENT DOCUMENTS

| | | |
|---|---|---|
| EP | 0 548 039 | 6/1993 |
| EP | 0 405 043 | 1/1999 |

* cited by examiner

*Primary Examiner*—Alexander S. Thomas
(74) *Attorney, Agent, or Firm*—Browdy and Neimark, PLLC

(57) ABSTRACT

A disk consists of one or more plies or layers (1, 2, 3) which lie one on the other and which are connected to one another in their edge region (10) and consequently have a compression region (20) on their circumference (4). Such a disk is provided for the application and/or absorption of liquid or semisolid substances. In this case, the compression region (20) is provided at a radial distance (B) from the circumference (4) of the disk. Consequently, the material fibers directed outward from the compression region (20) are so long that they are not rigid, but, instead, are slightly flexible.

3 Claims, 8 Drawing Sheets

DISK METHOD FOR PRODUCING THE SAME AND DEVICE FOR CARRYING OUT SAID METHOD

The present invention relates to a disk or a swab consisting of one or more plies for the application and/or absorption of liquid or semisolid substances, edge parts of the ply or plies lying one on the other in a sheetlike manner, and the disk having a compression region on its circumference, to a method for the production of same and to a device for carrying out the method.

A disk or a swab of this generic type, made from cotton wadding and having a round, elliptic or angular shape, are known, for example, from EP-B 0 405 043.

Disks of the generic type mentioned have become an article of use in hygiene, cosmetics and medicine. The products hitherto obtainable on the market, although satisfying the requirements as to absorbency and softness, nevertheless exhibit an undesirable formation of fluff, so that wadding fibers are left behind on the skin when a liquid or semisolid substance is applied to the skin or is washed away from this. Another disadvantage of these wadding disks which are already known is that the wadding layers lying one on the other have insufficient cohesion, so that the wadding disk, while being used, falls apart at a relatively early stage.

The European patent specification mentioned, admittedly, discloses wadding disks in which the edges of the individual layers of the disk are connected to one another. This connection point forms a kind of seam in which the fibers of the individual disk layers are intermingled and connected to one another. Such a seam is relatively rigid. Particularly when a person's skin is sensitive, a scratching sensation may arise when such a disk is being used.

The object of the present invention is to eliminate the disadvantages mentioned and further disadvantages of the disks which are already known.

Since, in the case of a round disk according to the invention, the sheetlike edge parts of the material plies form an essentially flat ring, the edge parts of the plies lying one on the other in this ring, and since this ring is defined on its outside by the circumferential surface of the disk and on its inside by the zone of the compression region or of the groove, a distance between the circumferential surface of the disk and the compression region can be selected such that the material fibers directed outward from the compression region are so long that they are not rigid, but, instead, are slightly flexible.

Where both disk and method are concerned, it must be noted that the term "radial distance" refers to the distance from any center of symmetry of the disk or from a center of gravity of the disk, this being directly understandable in the case of polygons.

Figure 2:
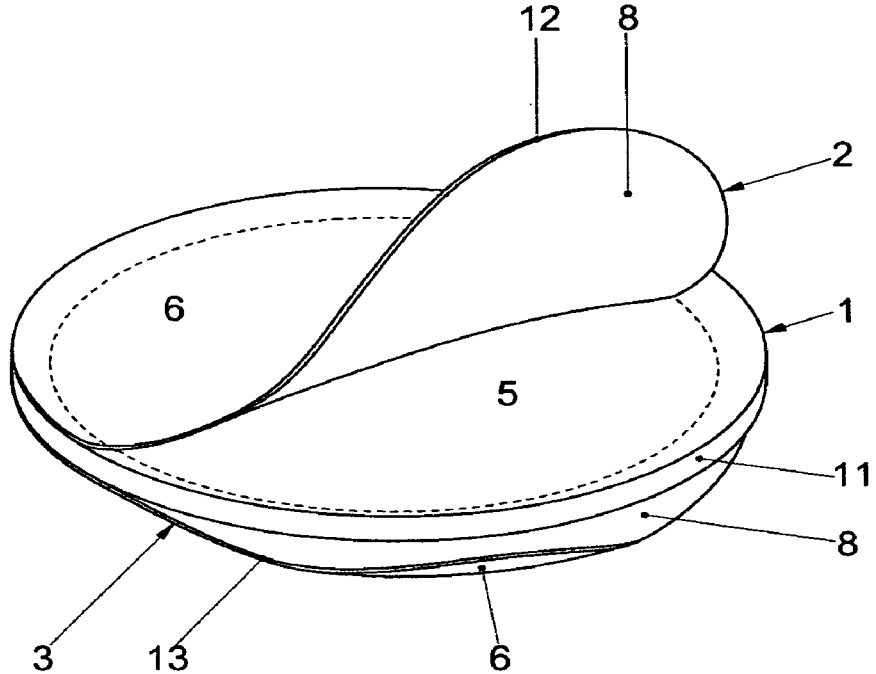
Figure 1:
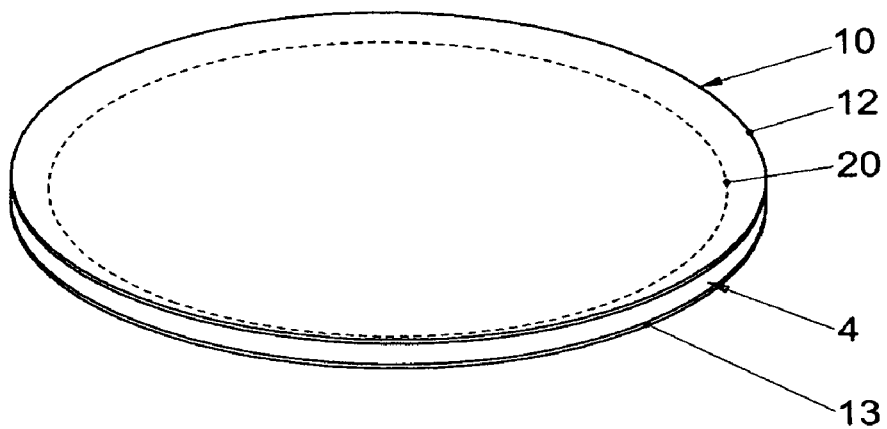
Figure 3:
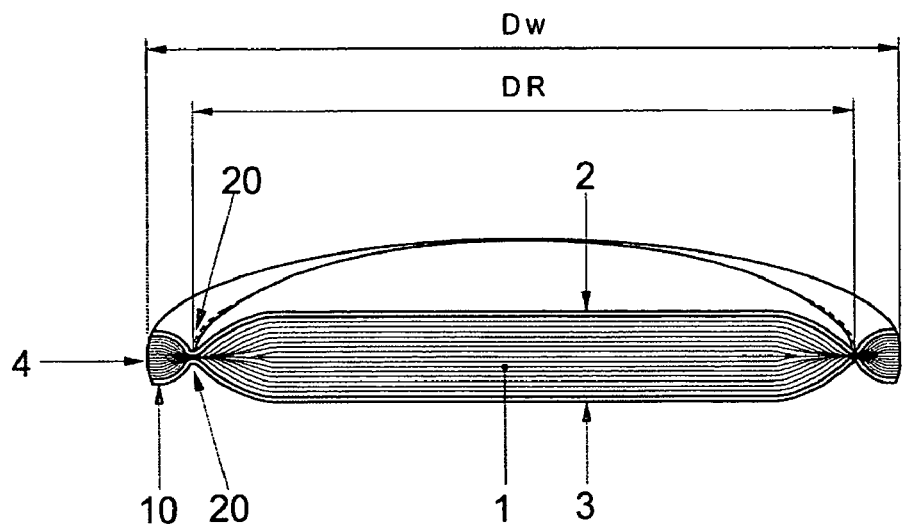
Figure 4:
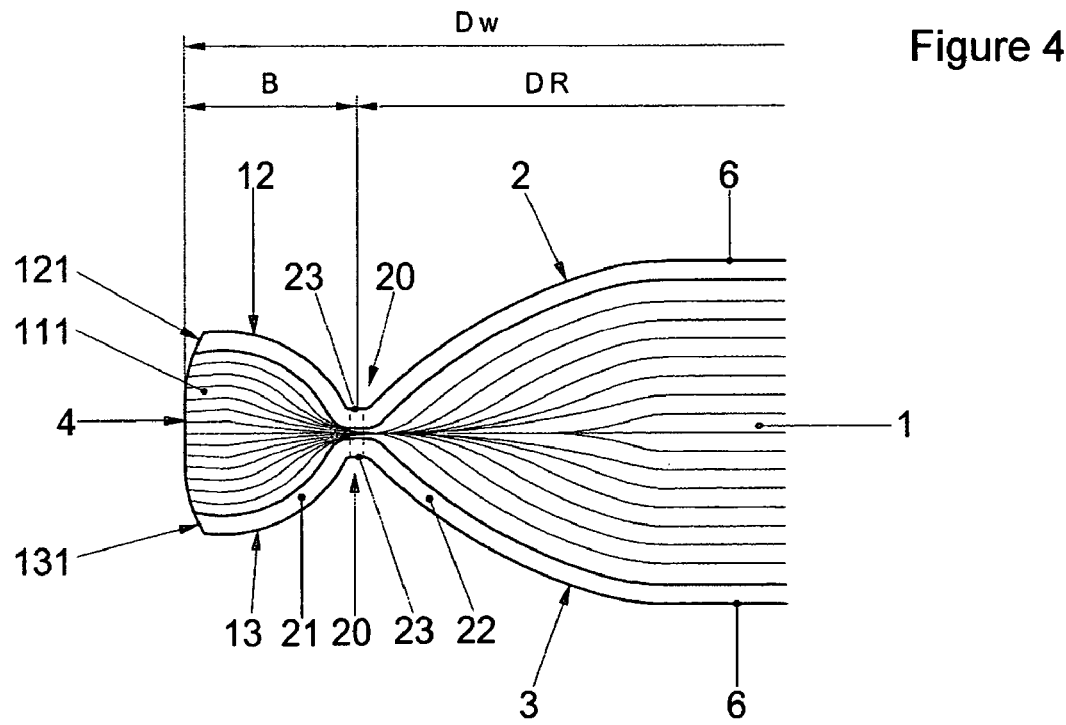
Figure 5:
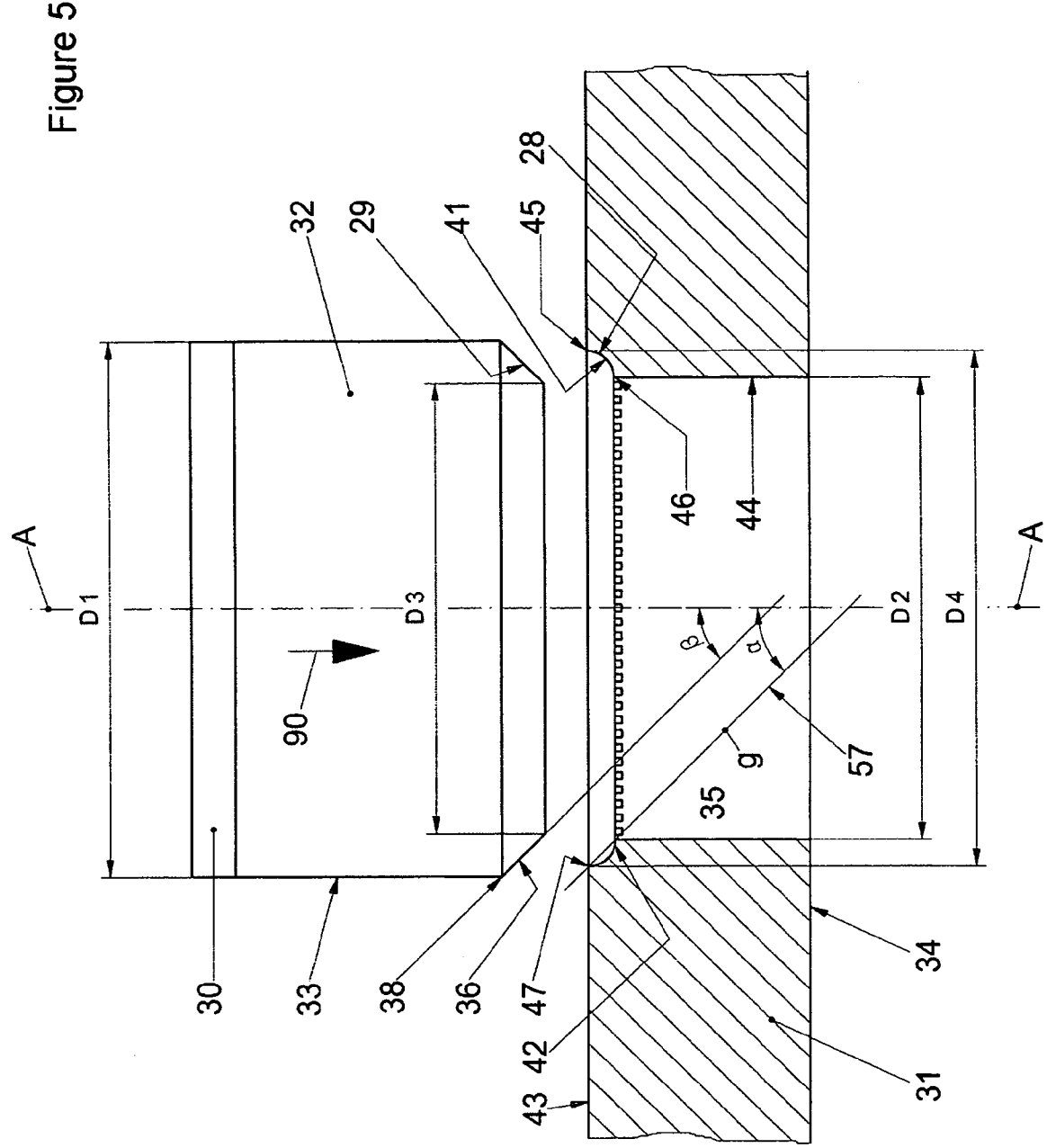
Figure 6:
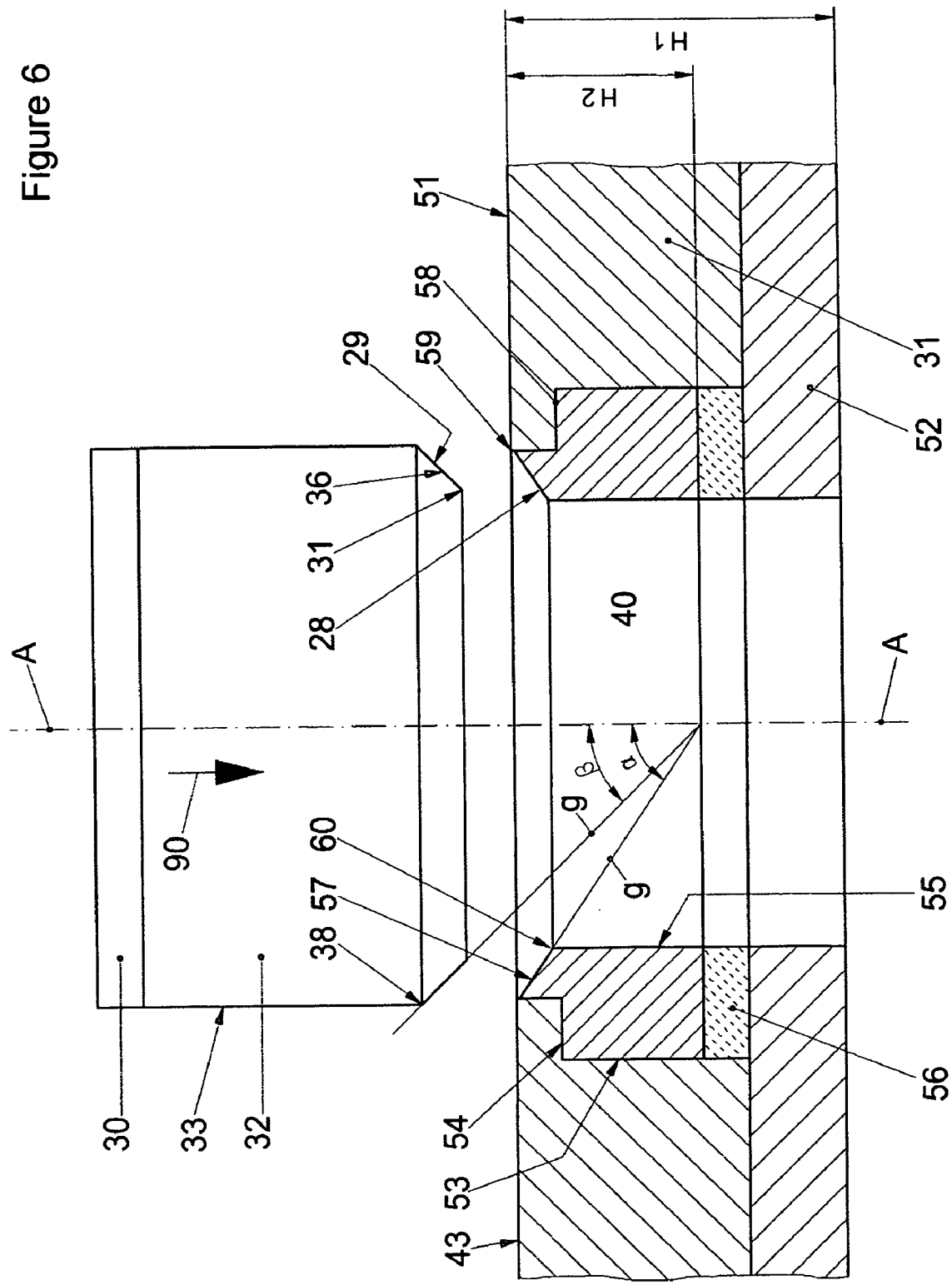
Figure 7:
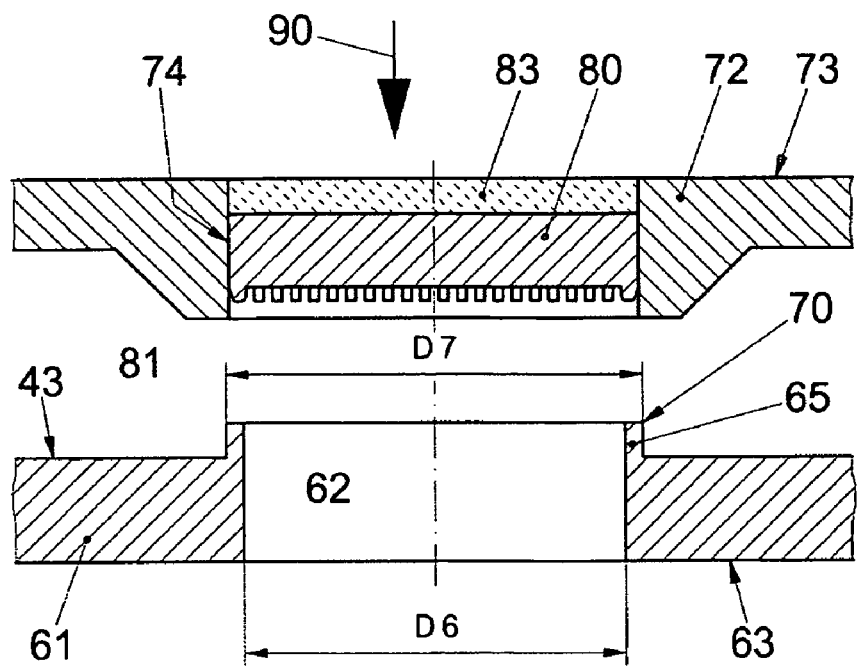
Figure 8:
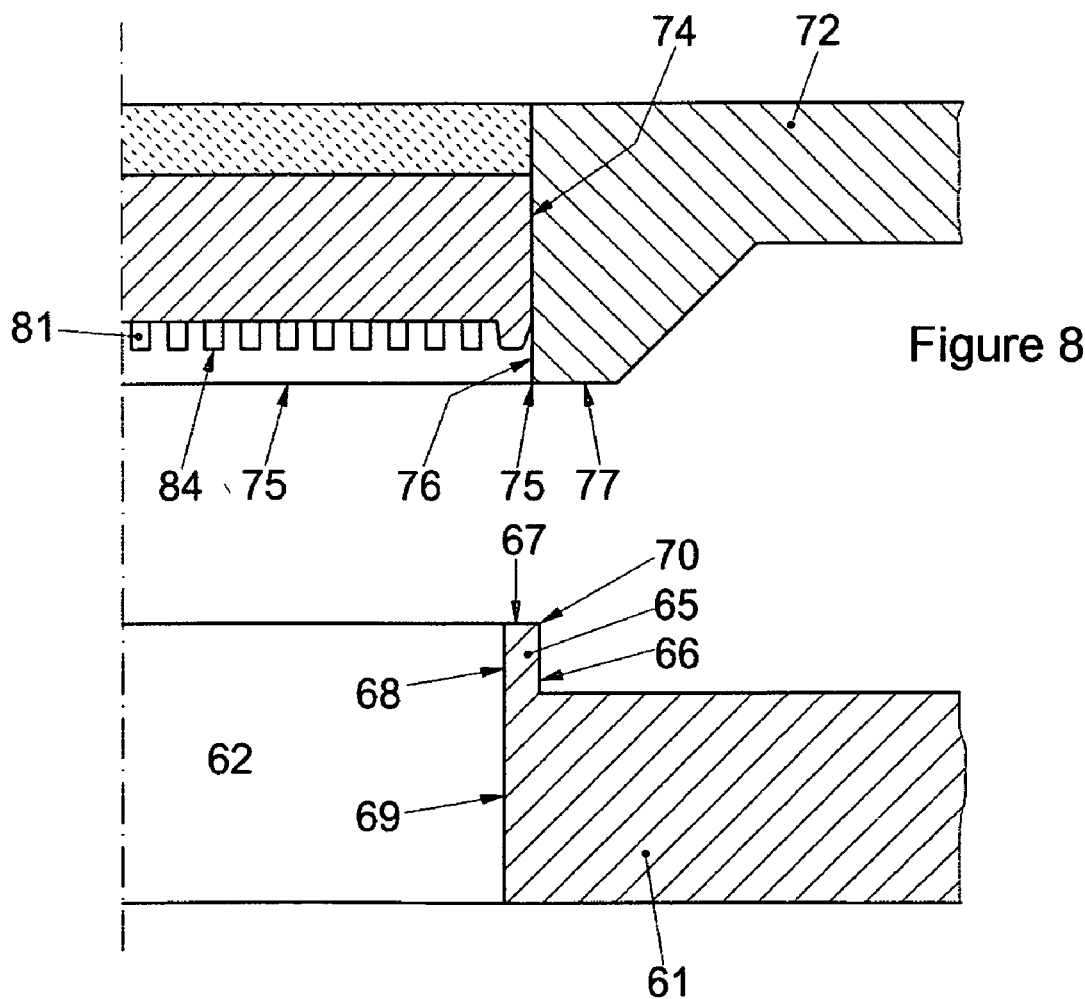
Figure 9:
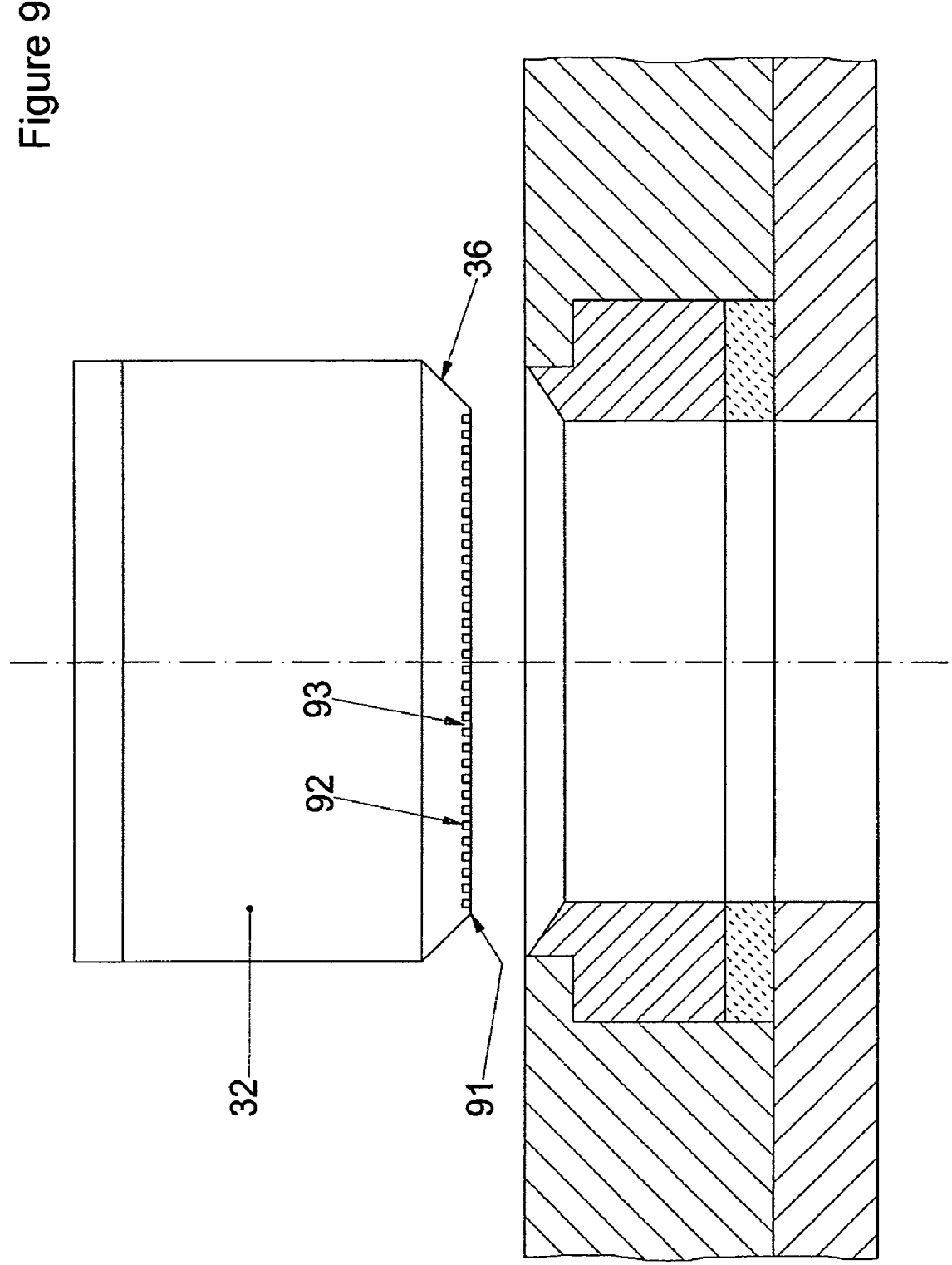
Figure 10:
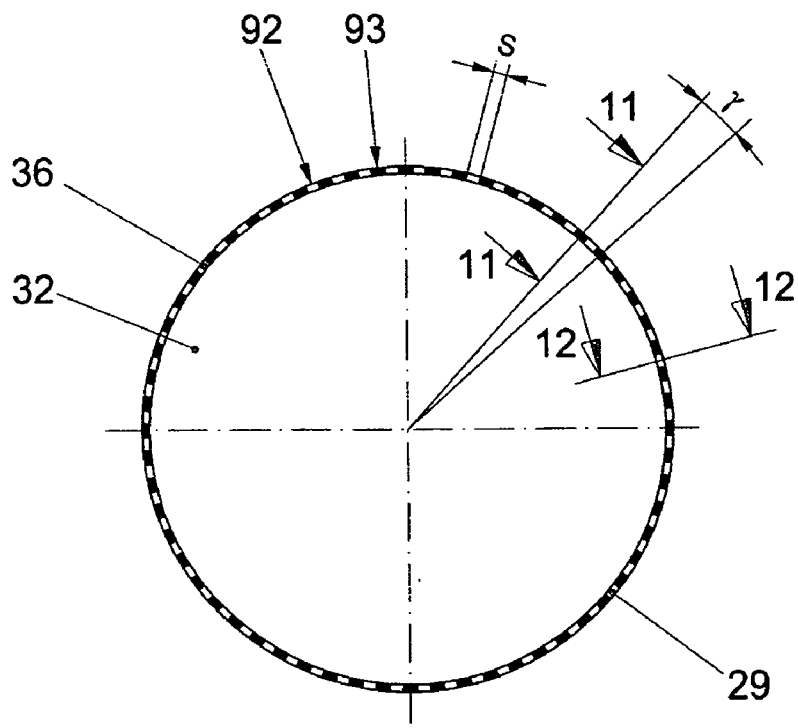
Figure 11:
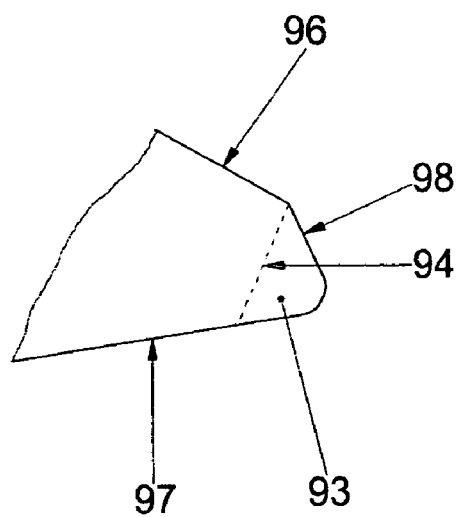
Figure 12:
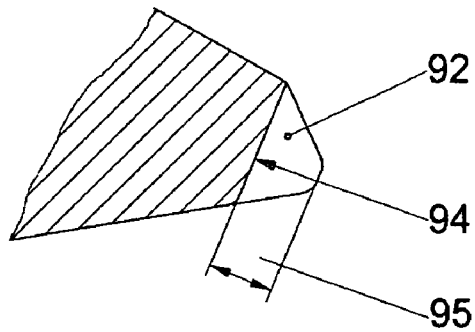
Figure 13:
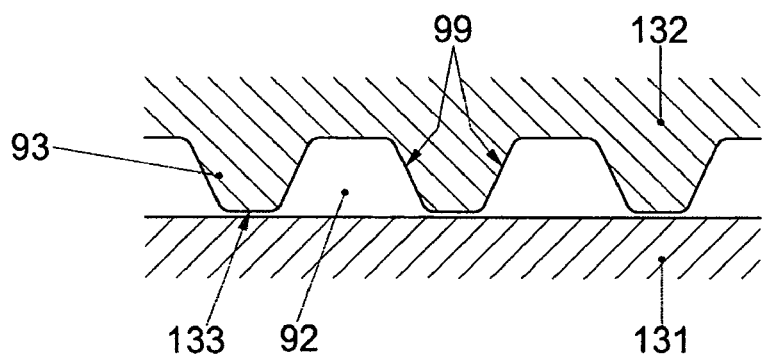
Figure 14:
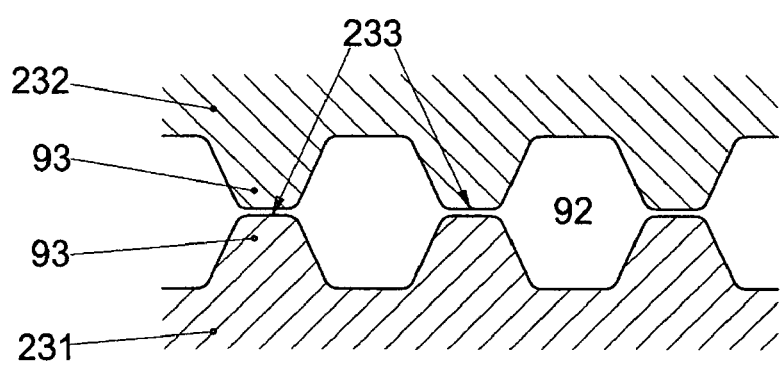
Figure 15:
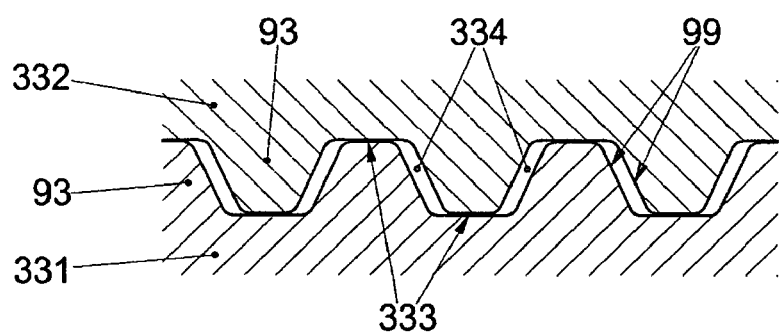
Figure 16:
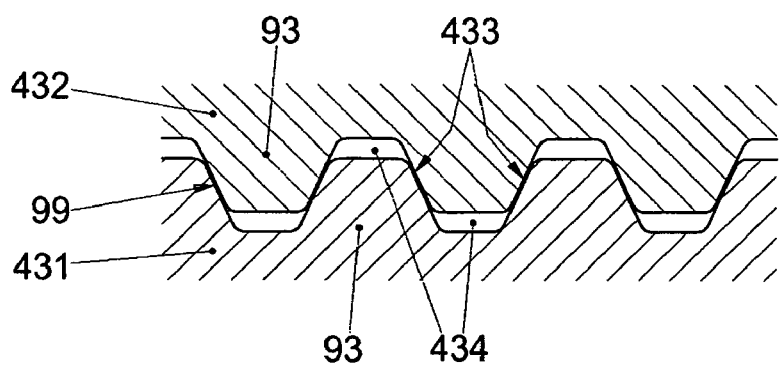

Exemplary embodiments of the present invention are explained in more detail below, by way of example, with reference to the accompanying drawings, in which:

FIG. 1 shows, in perspective, a disk according to a first exemplary embodiment of the invention, FIG. 2 shows, in perspective, the disk from FIG. 1, in which the layers which it has and the edges of which are normally connected to one another have been placed at a distance from one another in a region of said edges, FIG. 3 shows the disk from FIG. 1 in a vertical section, FIG. 4 shows, enlarged, a detail from FIG. 3, FIG. 5 shows, in a vertical section, a first version of a tool of a device for the production of the disk, FIG. 6 shows, in a vertical section, a second version of a tool of a device for the production of the disk, FIG. 7 shows, in a vertical section, a third version of a tool of a device for the production of the disk, FIG. 8 shows, enlarged, a detail of the tool from FIG. 7, FIG. 9 shows, in a vertical section, a fourth version of a tool of a device for the production of the disk, FIG. 10 shows a diagrammatic bottom view of the male die of the tool according to FIG. 9, FIG. 11 shows a cross-sectional view of a detail along the line 11—11 from FIG. 10, FIG. 12 shows a cross-sectional view of a detail along the line 12—12 from FIG. 10, FIG. 13 shows a diagrammatic side view, from the inside, of the female die and male die according to a first embodiment of a male die and female die, FIG. 14 shows a diagrammatic side view, from the inside, of the female die and male die according to a second embodiment of a male die and female die, FIG. 15 shows a diagrammatic side view, from the inside, of the female die and male die according to a third embodiment of a male die and female die, and FIG. 16 shows a diagrammatic side view, from the inside, of the female die and male die according to a fourth embodiment of a male die and female die.

The disk or swab illustrated in FIG. 1 to 4 may serve, for example, for the application, removal and/or absorption of liquid or semisolid substances. In this illustrated example, it has three layers or plies 1, 2 and 3 (FIG. 2), each of which has a circular contour. The disk illustrated thus has a circular circumferential wall 4. The disk does not need solely to have a circular contour. Its contour or circumferential wall 4 may also run elliptically or else angularly, that is to say form a polygon. In a simple version, the present disk may have only two plies. These two plies may be the middle layer 1 and only one of the outer plies 2 or 3 or only the two outer plies 2 and 3.

In other embodiments, there may even be a structure having no plies, as it were a single-ply structure, in which, for example, cellulose elements are deposited in a single layer and then pressed together.

Identical features have been designated in each case by the same reference symbols in all the figures.

For clearer illustration, the present, that is to say, here, three-ply, disk in FIG. 2 is designed in such a way that the plies 1 to 3 of the disk, which normally lie one on the other, are located at a distance from one another in a region of the circumference of the disk. The middle ply or layer 1 of the disk is assigned the two further outer layers 2 and 3, in such a way that the outer layers 2 and 3 lie, over their inner large surfaces 8, on the plane large surfaces 5 of the middle layer 1. The middle ply 1 has an edge part 11, the upper outer ply 2 has an edge part 12 and the lower outer ply 3 has an edge part 13.

The layers 1 to 3 may consist of the same material or of different materials. The material of the layers 1 to 3 is to be absorbent. Advantageously, this material or said materials is or are fibrous, in which case the fiber material may be cotton, viscose, synthetic fibers or a mixture of these. It is particularly advantageous if cotton wadding is used for the layers 1 to 3.

The material layers 1, 2 and 3 are assigned to one another in such a way that they form a cohesive sandwich structure. This is achieved, for example, in that at least the edge parts 11, 12 and 13 of said material layers 1 to 3 are connected to one another or interconnected in a sheetlike manner.

If the diameter of the inner material ply 1 is smaller than the diameter of the outer plies 2 and 3, as illustrated in FIG. 2, the edge parts 12 and 13 of the outer material plies 2 and 3 then lie directly one on the other.

FIGS. 3 and 4 illustrate a further version of the disk, in which the diameter of all the material plies 1 to 3 is approximately equal. In this case, that material 111 of the inner ply 1 which is located in the edge region 11 of the middle ply 1 lies between the edge parts 12 and 13 of the outer plies 2 and 3. The diameter of the inner ply 1 with regard to the diameter of the outer plies 2 and 3 to be selected such that the tips of the fringes 111 of the inner ply 1 lie in a line with the end faces 121 and 131 of the outer plies 2 and 3 in the finished product. Consequently, the circumferential wall 4 of such a disk comprises the partially fringed material 111 of the middle ply 1 and the circumferential or end faces 121 and 131 of the edges 12 and 13 of the outer plies 2 and 3 of the disk.

The same applies both to two-ply disks and to disks without a ply structure. Even the last-mentioned disks have a region of fringed material which, in the exemplary embodiment illustrated in FIG. 4, has been given the reference symbol 111.

The disk has at least one groove 20. This groove 20 extends either continuously or discontinuously, that is to say in at least one limited region of the length of the disk circumference, along the circumference of the disk. The discontinuous run of the groove 20 occurs, for example, when the circumferential surface 4 of the disk has corners. It is also conceivable, however, for the groove 20 to be formed only in sections along the circumference of a circular disk.

The groove 20 extends, for example, at a distance from and parallel to the circumferential surface 4 of the disk. The distance may be constant or may vary. The disk (FIG. 1 to 4) has a first circularly running groove 20 in the upper outer ply 2 and a second circularly running groove 20 in the lower outer ply 3. The respective groove 20 is formed in the fibrous material of the respective ply 1 or 2 or 3 from the outer large surface 5 or 6 of the latter. Both the upper and the lower groove 20 have the same diameter Dr and they run parallel to the circumferential surface 4 of the disk. The grooves 20 which are assigned to one another lie one above the other or opposite to one another. The respective groove 20 subdivides the respective ply 1, 2 or 3 into a middle or large-area portion 5 or 6 and an essentially annular portion 11, 12 or 13. The diameter Dr of the groove 20 is therefore smaller than the diameter Du of the circumferential surface 4 of the disk.

The cross section of the respective groove 20 is in the form of an open U. Consequently, the cross section of the groove 20 has flanks 21 and 22 running obliquely apart from one another and an arcuate bottom 23 (FIG. 4) connecting to one another those ends of the flanks 21 and 22 which lie nearer to one another. The first flank 21 of the groove 20 in the outer ply 2 or 3 merges into the edge portion 12 or 13 of the respective outer ply 2 or 3. The second U-flank 22 of the groove 20 merges into the middle large-area portion 6 of the outer ply 2 or 3.

The grooves 20 of a disk are oriented in directions opposite to one another, so that they open in directions opposite to one another. Their bottoms 23 face one another with their convex portions. Under some circumstances, it may be expedient if there is more than one groove 20 in the plies 1 to 3. In this case, such grooves have different diameters and they lie concentrically to one another.

In the version of the disk according to FIG. 1 and 2, the fibers of the outer plies 2 and 3, which are located in the region of the outside of the bottoms 23 of the grooves 20 assigned to one another, lie directly one on the other. In the version of the disk according to FIGS. 3 and 4, the fibrous material of the first or inner ply 1 lies between the bottoms 23 of the grooves 20 assigned to one another. During the formation of the grooves 20, the fibers of the inner ply 1 are very highly pressed together or nipped between the material of the groove bottoms 23. The result of this is that the fibers of the inner ply 1 are held on the spot by the fibers of the outer plies 2 and 3 and cannot move with respect to these. The inner ply 1 consisting of fibrous material may be looser than the fibrous material of the outer plies 2, 3 of the disk. In an embodiment, not illustrated in the figures, of a disk without plies, the fiber material not forming definite plies is pressed together in the region of the groove 20, in order to obtain per se the desired nipping and pressing together of the edge regions of the swab.

The dimensional line relating to the diameter Dr of the groove 20 passes through the middle of the width of the bottom 23 of the groove 20. Half the difference between the diameter Du of the circumferential surface 4 and the diameter of the groove Dr gives the width B of the annular edge 10 of the disk. This width of the annular disk edge 10 may amount, for example, to 1 mm. The width of the groove 20 itself may amount, for example, to 0.5 mm.

The middle of the bottom 23 of the respective groove 20 is thus located at a distance B from the circumferential surface 4 of the disk or from the circumferential surface 121 or 131 of the outer ply 2 or 3. The width B of this annular edge 10 of the disk is to be selected such that it is possible for the fibers of the plies 1 to 3 to lie one on the other in a sheetlike manner in the edge region 10 of the disk over sufficiently long sections. It arises from this, furthermore, that the length of the fibers of the plies 1 to 3 is to be selected larger than the width B of the disk edge 10, so that said fibers, when they are located, at one end, in the region of the disk edge 10, can extend through the region of the grooves 20 into the interior 5 or 6 of the respective ply 1 to 3. For example, where cotton fibers are concerned, this requirement can be fulfilled without difficulty. This sheetlike lying of the materials of only the outer plies 2 and 3 (FIG. 1 and 2) or of all three plies 1 to 3 one on the other takes place, above all, in that portion of the edge region 10 of the disk which is located between the bottoms 23 of the grooves 20 opposite one another.

The distance between the circumferential surface 4 and the diameter of the groove 20 may also be selected such that those portions of the fibers of the inner ply 1 which project outward from the groove 20 are so long that they are not rigid, but slightly flexible. The fringes 11 having such a length prevent the scratching sensation already mentioned, when the disk is used in the way specified.

With regard to the disk already known from EU-B 0 405 043, the connection of the fibers of all three plies 1 to 3 occurs while the disk is being punched out from a three-ply material web, specifically by the ends of the fibers located in the region of the punching knives being pinched together. Sometimes, that bead at the edge of the disk in which the ends of the cut-off fibers are pinched together comes loose. This is because the ends of the fibers which are located inside the bead are very short.

During the punching-out operation, the fibers of, above all, the outer plies are drawn to a great extent out of the remaining material of the outer plies in the direction of the inner ply, so that these fibers lose the original hold with the fibers of the remaining part of the material in the outer ply.

This often causes a tear to occur between the circumferential bead, in which the ends of the fibers of all three plies are pressed together, and the remaining material of the outer plies. This tear extends mostly over an appreciable length of the circumference of the disk, with the result that the original cohesion of the three disk plies may likewise be lost.

Where the present disk is concerned, these problems do not arise. The cohesion of the disk plies 1 to 3 is determined by the conditions in the region of the relatively wide grooves 20 of the relatively wide edge 10 of the disk. In the region of the bottom 23 of the grooves 20, the material fibers are not cut off, but, instead, continue their run out of the middle region 6 of the ply into the edge parts 11, 12 and 13 of the plies 1 to 3. When the plies 1 to 3 or at least the outer plies 2 and 3 lie one on the other over a large area in the region of the grooves 20, there is friction or adhesion among the adjacent material fibers, specifically over considerable lengths of the latter. In the present disk, the fibers located in the region of the second U-flanks 22 of the outer layers 2 and 3 are not drawn to such a great extent as hitherto out of the bond with the fibers of the remaining part 6 of the outer ply 2 or 3, because, instead, due to the formation of the groove 20, only the run of these fibers is changed. The same effect likewise occurs in the case of single-ply or multi-ply disks.

At the location of the groove 20, the material, for example a fibrous material, there is pressed together or pinched together in such a way that the material plies are and remain connected to one another in the region of the disk groove 20.

In this case, instead of the groove 20, in general, a compression region may be provided, which is provided at a radial distance from the circular circumferential edge 4. This radial distance may be constant or variable (varying periodically along the circumferential path). Its presence ensures that material 111 remains on the far side of the compression region 20, along with the advantages described. In particular, and this is achieved by means of the stamping tools according to FIG. 5 and the following figures, the compression region is a periodic sequence of stamped and nipped regions, in which case the stamped portions may form continuous holes in the disk.

Furthermore, under the circumstances mentioned, it is possible for the fibrous material located in the region of the grooves 20 of the respective plies 2 and 3 to be pressed together or pinched together in such a way that the material plies 2 and 3 are connected to one another very firmly in the region of the disk grooves 20. For when a sufficiently high pressure is exerted on the fiber material in the region of the grooves 20, the fibers of one outer ply 2 or 3 penetrate into the region of the fiber material of the other outer ply 3 or 2, and, as a result, a firm connection occurs between relatively long sections of the fibers of the plies 2 and 3 lying one above the other. The same applies correspondingly when the fibers of the edge part 111 of the inner ply 1 are located between the edge parts 121 and 131 of the outer plies 2 and 3. In the case of a single-ply swab, this relates to the fibers which run essentially in a first, for example uppermost, plane and which make a firm connection with other fibers running in a second, for example lowermost, plane.

FIG. 5 shows, in a vertical section, a first device for the production of the present disk when this disk has a circumferential surface 4 running in a roundish manner, that is to say, for example, circularly or elliptically. This device comprises, inter alia, a female die 31 and a male die 32 associated with it. It goes without saying that these components of the present device can be used in a press known per se which can execute the necessary movements of the male die 32. Said components of the present device are designed in such a way that they have a cutting portion and a nipping portion, these portions being parts of an active portion 28 on the female die 31 and of an active portion 29 on the male die 32.

In the use, mentioned here, for a round swab, the basic body 33 of the male die 32 is essentially cylindrical and said active portion 29 on the male die 32 is assigned to the end face of the cylinder 33. The male die basic body 33 has a diameter D1. That end face of the male die basic body 33 which is located opposite the active portion 29 of the male die 32 and on which the press acts when this device is in operation is provided with a ply 30. This ply 30 consists of a resilient material, for example of an elastomer.

The basic body 34 of the female die 31 is essentially plate-shaped and an orifice 35 is formed in this plate 34. The axis of this female die orifice 35 and the axis of the male die 32 lie in a common axis A. The diameter D2 of the orifice 35 in the female die 31 is smaller than the diameter D1 of the male die 32. Said active portion 28 on the female die 31 is formed in that mouth of the female die orifice 35 which faces the male die 32.

The active portion 29 of the male die 32 comprises a peripheral chamfer 36 which extends along the circumference of the male die basic body 33. This chamfer 36 has a lateral surface which is in the form of the envelope of a truncated cone. The diameter of that base of this truncated cone 36 which adjoins the basic body 33 of the male die 32 likewise has the diameter D1. At the transition between the male die basic body 33 and this cone wall 36, an edge 38 is present. The diameter of that base of the truncated cone 36 which faces away from the basic body 33 of the male die 32 has a diameter D3. This diameter D3 is smaller than the diameter D2 of the orifice 35 in the female die 31.

Since the active portion 29 just described projects from the end face of the male die basic body 33, this portion 29 is also designated as a convex chamfer.

The active portion 28 of the female die 31 comprises a peripheral groove 41 which is formed in that mouth of the female die orifice 35 which faces the male die 32. The section through this groove 41 or through the bottom 42 of this groove 41 is in the form of a curved line, the curvature of this line being directed into the interior of the material of the female die 31. The angular position of this curve 42 is about 90 degrees. Since this chamfer 41 is directed into the interior of the female die, this chamfer 41 is also called a concave chamfer. The angle of the curve 42 may also lie, in particular, between 70 and 110 degrees.

One end 47 of the curve 42 adjoins the upper surface 43 of the female die basic body 34, specifically so as to form an edge 45. This end part 47 of the curve 42 is virtually perpendicular to said female die surface 43. This edge 45 has a diameter D4, and this diameter D4 is smaller than the diameter D1 of the upper edge 38 on the male die 32. The other end of the bottom curve 42 adjoins the inner face 44 of the orifice 35 in the female die 31, specifically so as to form an edge 46. This edge 46 has the same diameter D2 as the female die orifice 35. This end part 46 of the bottom curve 42 is essentially perpendicular to the inner face 44 of the orifice 35 in the female die 31.

A straight line g may be imagined which passes through the points 45 and 46 and intersects the axis A so as to form an angle alpha. The angle of inclination alpha ($\alpha$) of this straight line 9 and therefore also of a cone envelope 57 which is drawn through said points 45 and 46 and in which the straight line g forms the generatrix is somewhat larger than the angle of inclination beta ($\beta$) of the chamfer 36 on the male die 32 with respect to the central axis A. The exemplary embodiment of the invention shows, in FIG. 5, an application in which D1>D4>D2>D3.

During the production of the disks, a web-shaped material is led between the female die 31 and the male die 32, that is to say above the surface 43 of the female die 31. The angle of inclination beta of the cone wall 36 on the male die 32 is less steep or is selected larger than the angle alpha. During the closing of the tool as a result of the movement of the male die 32 in relation to the female die 31 according to the arrow 90, first the cone envelope 36 comes to lie on the outer edge 45 of the concave chamfer 41 in such a way that the disk is cut out from the web-shaped material between the cone wall 36 on the male die 32 and the edge 45 on the female die 31. Moreover, the edge part of this disk is nipped between the cone wall 36 and the lower edge 46 on the female die 31. This nipping gives rise to the groove 20, already described, in the plies 2 and 3 and to the ends of the fibers in the edge part 11 of the middle ply 1 being pressed together (FIG. 4). It must be noted that, in the embodiment illustrated in FIG. 5, a periodic structure corresponding to FIG. 10 is provided in the female die 31. In the case of a simpler version, however, it would also be possible for no periodic structure to be provided.

In the embodiment of the present device, as illustrated in FIG. 6, the male die 32 is designed in virtually the same way as was described in connection with FIGS. 5 and 9.

The female die 31 has a main plate 51 and an auxiliary plate 52 lying below the latter. The female die orifice 35 passes through the two female die plates 51 and 52. An orifice 53 with an enlarged diameter is formed, from the underside of the main plate 51, in this main plate 51. That mouth of this enlarged orifice 53 which faces the male die 32 is provided with an annular abutment 54 which is arranged inside the enlarged orifice 53 and the outer face of which is flush with the surface 43 of the female die 31. The diameter of the orifice in this peripheral abutment 54 is somewhat smaller than the diameter of the male die basic body 33.

The orifice 53 with the enlarged diameter is lined with a clamping ring 55. In the outer edge of the upper end of the clamping ring 55 is formed a peripheral recess 58, the shape and dimensions of which are selected such that the peripheral abutment 54 can be accommodated in this step 58. The height of the peripheral recess 58 in the clamping ring 55 is smaller than the height of the peripheral abutment 54 in the female die plate 51. The result of this is that the top side of the clamping ring 55 lies at a lower level than the top side 43 of the female die 31.

The active portion 28 of the female die 31 comprises a cutting edge 59. This active portion 28 comprises, furthermore, a chamfer 57 which is formed in the upper end of the clamping ring 55. In the present case, this chamfer 57 has, in cross section, the form of the envelope of a cone. The angle of inclination a (alpha) of this cone envelope 57 with respect to the central axis A is somewhat larger than the angle of inclination β (beta) of the chamfer 36 on the male die 32.

The height H2 of the clamping ring 55 is smaller than the height H1 of the main plate 51 of the female die 31. The gap located between the underside of the clamping ring 55 and the auxiliary plate 52 lying below it is filled by a flat ring 56 which consists of a resilient material, for example an elastomer. The height of this flat ring 56 is selected such that, in the state of rest of the device, this flat ring 56 slightly presses the clamping ring 55 against the underside of the peripheral abutment 54.

During the descent of the male die 32, the web material is first pressed together between the cone 36 on the male die 32 and the cutting edge 59 on the female die 31 in such a way that the disk is cut out from the material web. The edge part of the cut-out disk is in this case pressed together between the conical surfaces 36 and 57 in such a way that the bond is formed among the fibers of the individual fiber plies 1 to 3. Since the chamfer 36 on the male die 32 runs somewhat more steeply than that on the female die, the peripheral grooves 20 in the disk are formed in a single operation together with the cutting out of the latter. The device according to FIG. 6 has no periodic stamping structure either in the female die 31 or in the male die 32. This could, however, be added both in the female die 31 and in the male die 32 according to the exemplary embodiments of FIG. 5 or 7.

FIGS. 7 and 8 show yet another possibility for the design of the present device. The essentially plate-shaped female die 61 has an orifice 62 with a diameter D6. A peripheral or annular projection 65 rises out of the surface 43 of the female die basic body 63. This ring 65 has a quadrangular cross section with the free-standing wall surfaces 66, 67 and 68. The last-mentioned wall surface 68 is flush with the inner face 69 of the orifice in the female die 61. The second wall surface 67 extends horizontally away from the inner face 68, and, at the end of this end face 67, the likewise already mentioned outer face 66 of the projection 65 adjoins the end face 67 at right angles, so that this outer face 66 terminates in the surface 43 of the female die 61. The outer face 66 has a diameter D7, the diameter D6 of the female die orifice 62 being smaller than the diameter D7 of the outer face 66.

In the present case, the basic body 73 of the male die 72 is somewhat sheetlike and has a continuous orifice 74. The diameter of this male die orifice 74 is equal to the diameter D7 of the outer face 66 of the ring 65. The edge 70 on the female die 61, said edge being located between the wall surface 66 and 67 of the projection 65, serves as a cutting edge on the female die. The corresponding countercutting edge 75 on the male die 72 is defined by, virtually at right angles to one another, the inner face 76 of the orifice 74 in the male die 72 and the end face 77 of the male die 72, said end face being at right angles to said inner face and directly adjoining the male die orifice 74.

A clamping plate 80 is arranged in the male die orifice 74. This clamping plate 80 is provided with a peripheral bead 81 which is formed on the large surface, facing the female die 61, of the clamping plate 80 and which projects from this large surface toward the female die 61. This bead 81 adjoins the outer edge of the clamping plate 80. The height of the clamping plate 80 is smaller than the height of the basic body 73 of the male die 72, and the free space above the clamping plate 80 is filled with a resilient medium 83 which may be, for example, an elastomer. In FIG. 7 and 8, the bead 81 is not of uniform height, but has teeth. It is also possible to provide a straightforward peripheral clamping bead 81.

When the male die 72 descends in a movement in the direction of the arrow 90, the disk is cut out from the web material by means of the cutting edges 70 and 75. With a continued downward movement of the male die 72, the edge part of the disk is nipped between the end 67 of the projection 65 on the female die 61 and the bead 81 of the clamping plate 80. In this case, the fibers of the three plies 1 to 3 of the disk are pressed onto or into one another so firmly that a connection between the edge parts of these plies 1 to 3 is obtained.

The essence of the method for the production of the present disks is that the disk is cut out from a single-ply or multi-ply material web, and grooves are formed at a distance from said cutting point. These two operations are carried out during a single stroke of the device. In the region of the grooves, the fibers of the material of the material ply or material plies lying one on the other have been driven one into the other to an extent such that the plies lying one on the other are firmly connected to one another at least in the region of these grooves.

At least one of the material plies of the disk may be colored, which may be achieved, for example, in a method known per se. Or at least one of the material plies may contain colored fibers. Furthermore, the outer face of at least one of the outer plies may have recessed points, for example stamped points. If desired, these last-described measures could be combined with one another, so that the stamped points or the unstamped points of a disk are colored.

FIG. 9 shows, in a vertical section, a fourth version of a tool of a device for the production of the disk. As compared with the version of FIG. 6, the male die 32 is provided at its conical end region 36, near the lower edge 91, with an intermittent structure 92, 93 which consists of solid material or noses 93 and recesses 92. This structure can be seen more clearly in FIG. 10 to 12.

FIG. 10 shows a diagrammatic bottom view of the male die 32 of the tool according to FIG. 9, FIG. 11 then showing a cross-sectional view of a detail along the line 11—11 from FIG. 10, and FIG. 12 showing a cross-sectional view of a detail along the line 12—12 from FIG. 10.

FIG. 10 shows the male die 32 highly diagrammatically, in particular only the stamping cone 36 as the active region 29 of the male die 32. This active region is illustrated as a complete circle, that is to say in all four quadrants. It consists of noses 93 and of recesses 92 between these noses 93. In the case of a stamping ring with a diameter of, for example, 57 millimeters, the recess 92 or distance S between two adjacent noses 93 (or between two recesses 92) is, for example, between 0.3 and 1.5 millimeters. The angle gamma (γ) spanned in this case is, for example, 4.8 degrees. The radial line 11—11 passes through a nose 93 which is then illustrated in the view of a detail in FIG. 11. The radial line 12—12 passes through a recess 92 which is then illustrated in the view of a detail in FIG. 12.

FIG. 11 shows a nose 93 which extends beyond the level of the recess, said level being indicated by a broken line 94. FIG. 12 shows the recess 92, the bottom of which forms the line 94. The depth 95 of the recess 92 (or the height of the nose 93) may be between 0.3 and 1.5 millimeters, preferably between 0.5 and 1.0 millimeters.

The edge 96 is perpendicular to the cutting face and parallel to the mid-axis. The side 98 is at angle of 40 to 60 degrees and the side 97 at an angle of 30 degrees to the mid-axis.

FIG. 13 shows a diagrammatic side view, from the inside, of a female die 131 and a male die 132 according to a first embodiment of these. Consequently, such a female die/male die combination 131/132 can be used correspondingly in the devices according to the figures described above. The noses 93 and recesses 92 are designed in a similar way to the exemplary embodiment illustrated in FIG. 10 to 12, here oblique flanks 99 forming the transitions between the noses 93 and the recesses 92. The female die 131 has a plane design here, so that nipping of the disk occurs in the region 133 at the tips of the noses. The functions of female die and male die are, of course, exchangeable, that is to say the noses 93 are formed on the female die 131.

FIG. 14 shows a diagrammatic side view, from the inside, of a female die 231 and a male die 232 according to a second embodiment of these. Here, the female die 231 and male die 232 have noses 93 and recesses 92 located opposite one another, so that the nipping takes place in the regions 233 in which the noses 93 butt one onto the other.

FIG. 15 shows a diagrammatic side view, from the inside, of a female die 331 and a male die 332 according to a third embodiment of these. Here, a female die 331 and male die 332 have noses 93 and recesses 92 offset in relation to one another, the noses 93 being narrower than the width of the recesses 92, so that the nipping takes place in the regions 333 in which the noses 93 of the male die 332 butt onto the bottom surface of the recesses 92 of the female die 331 and vice versa. A free space 334 then remains in each case in the region of the flanks 99 of the male die 332 and female die 331.

Finally, FIG. 16 shows a diagrammatic side view, from the inside, of a female die 431 and a male die 432 according to a fourth embodiment of these. Here, the female die 431 and male die 432 also have noses 93 and recesses 92 offset in relation to one another, but in this case the noses 93 are wider than the width of the recesses 92, so that the nipping takes place in the regions 433 in which the flanks 99 of the noses 93 of the male die 432 and female die 431 butt onto the other. A free space 434 then remains in each case in the region between the tip of each nose 93 and the bottom surface of each recess 92 of the male die 332 and female die 331.

Various nipping effects and nipping structures in the disks according to FIG. 1 can be achieved by means of these designs of female dies and male dies which can be used in all the exemplary embodiments of FIGS. 5 to 10. A multiplicity of possibilities for the production of such disks are thus afforded. The dimensions of the angles and depths of the individual noses 93 and recesses 92 may be selected according to the materials and dimensions (for example, thickness) and shapes (for example, circular or ellipsoidal) used for the disk.

A person skilled in the art will note that stamping/nipping is carried out at the respective inner edge of the device and cutting is carried out at the outer edge. Furthermore, the convex shape of the curve 42 (FIG. 5) provides a reception space for the lateral bundle during stamping or nipping.

The invention claimed is:

1. A disk for the application and/or absorption of liquid or semisolid substances, consisting essentially of
   at least one upper ply and one lower ply of fibrous material, the upper ply and the lower ply having unattached edge parts lying one on the other in a sheetlike manner,
   the disk having a compression region at a radial distance from the circumference of the disk,
   the compression region being a groove formed on both sides of the edge parts of the plies,
   wherein the fibrous material which is located in the region of the groove is pressed together or pinched together in such a way that the plies of fibrous material are connected to one another in the region of the groove;
   characterized in that the compression region (20) is provided intermittently (92, 93).

2. The disk as claimed in claim 1, having an inner ply located between the upper and the lower ply, wherein the diameter of the inner ply is smaller than the diameter of the compression region.

3. The disk as claimed in claim 1, having an inner ply located between the upper and the lower ply, wherein the diameter of the inner ply is at least equal to the diameter of the outer material plies, wherein the material of the inner ply which is located in the edge region of the latter lies between the edge material of the outer plies and is pressed together or pinched together with the edge material.

* * * * *